（12）United States Patent
Froeberg

(10) Patent No.: US 6,553,313 B1
(45) Date of Patent: Apr. 22, 2003

(54) METHOD AND SYSTEM FOR UPDATING DIRECTED USER-BASED DYNAMIC ADVERTISING

(75) Inventor: Peter L. Froeberg, Cupertino, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/912,645

(22) Filed: Jul. 24, 2001

(51) Int. Cl.⁷ .......................... G01C 21/00; G08G 1/123
(52) U.S. Cl. ................... 701/213; 340/988; 342/357.09
(58) Field of Search ................................. 340/988, 990, 340/995; 701/200, 207, 209, 211, 213; 342/357, 357.08, 357.09

(56) References Cited

U.S. PATENT DOCUMENTS 6,012,012 A1 * 1/2001 Fleck et al. ................. 701/117
6,353,798 B1 * 3/2002 Green et al. ................. 701/213

* cited by examiner

*Primary Examiner*—Yonel Beaulieu
(74) *Attorney, Agent, or Firm*—Wagner, Murabito, Hao LLP

(57) ABSTRACT

A method and system for dynamically communicating content to an occupant of a moving vehicle according to the location and direction of travel of the vehicle. Position information (such as Global Positioning System information) is used to determine the location and the direction of travel of the vehicle. The vehicle provides its location and direction of travel to a central source (e.g., a server computer system). The central source provides to the vehicle content as a function of the vehicle's location and direction of travel as well as other factors such as time of day. The central source can also provide instructions prescribing when and where content is to be displayed. Using the vehicle's position and direction of travel as well as other factors such as the time of day, a particular item of content can be selected and communicated to an occupant of the vehicle.

26 Claims, 8 Drawing Sheets

METHOD AND SYSTEM FOR UPDATING DIRECTED USER-BASED DYNAMIC ADVERTISING

TECHNICAL FIELD

The present invention relates to the field of position determination systems. Specifically, the present invention pertains to a method for providing information to occupants of a mobile vehicle based on the vehicle's location and direction of travel.

BACKGROUND ART

Vehicles (e.g., automobiles) equipped with on-board navigation systems are becoming more common. These navigation systems typically rely on the Global Positioning System (GPS), or a similar type of positioning system, to determine the vehicle's position.

There are prior art applications in which the position information is used to target content (such as but not limited to advertising) to occupants of the vehicle based on the vehicle's location. This content is indexed by location and stored in a database residing on-board the vehicle. When the vehicle approaches a location contained in the database, the content associated with that location is communicated to the vehicle's occupants.

Such a system finds use, for example, when a user (e.g., a vehicle occupant) enters a query regarding the location of a particular type of merchant. For example, the user may request the location of the nearest hardware store or grocery store. Similarly, the user may request the nearest location of a particular restaurant, using the name of the restaurant. In response to the request, the prior art systems provide the location and perhaps other information, such as a map or directions.

A disadvantage to these prior art applications is that, while the prior art systems may provide the nearest location, it may not provide the location that is most convenient to the user. For example, the nearest location may be one block in the wrong direction down a one-way street, or one exit back on a freeway, with a more convenient location being a couple of blocks or exits ahead.

Therefore, what is needed is a system and/or method that can more effectively provide location-based content to users, in particular users who are occupants of a moving vehicle. The present invention provides a novel solution to this need.

DISCLOSURE OF THE INVENTION

The present invention provides a method and system that can more effectively provide location-based content to users, in particular users who are occupants of a moving vehicle.

The present embodiment of the present invention pertains to a method and system for dynamically communicating content to an occupant of a moving vehicle according to the location and direction of travel of the vehicle. Position information (such as Global Positioning System information) is used to determine the location of the vehicle. The direction of travel of the vehicle can also be determined from the position information.

In the present embodiment, the vehicle communicates its location to a central source (e.g., a server computer system) via a wireless communication link (e.g., a transceiver). The vehicle's direction of travel as well as other factors such as the vehicle's speed can also be communicated to the central source. The vehicle receives from the central source information pertaining to the display of content as a function of at least the vehicle's position, and perhaps the other factors as well.

In one embodiment, the information provided by the central source contains an item of content for immediate display. In another embodiment, the information provided by the central source contains items of content for later display and instructions prescribing when and where a respective item of content is to be displayed. In yet another embodiment, the information provided by the central source contains instructions prescribing when and where a respective item of content previously provided to and stored on the vehicle is to be displayed.

In one embodiment, the item of content is displayed to the occupant; in another embodiment, the item of content is communicated audibly to the occupant.

In one embodiment, the vehicle's position and direction of travel can be correlated to geographical information, and the geographical information can be factored into the selection of a particular item of content. The time of day can also be used to select a particular item of content. Other information, such as the vehicle's speed, can also be factored into the selection of an item of content to be communicated to the vehicle's occupants.

The present invention thus introduces new dimensions to the concept of providing content to users. In accordance with the present invention, content can be more precisely targeted by location, direction of travel, time of day, and/or other factors, making the content more relevant to users.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1A:
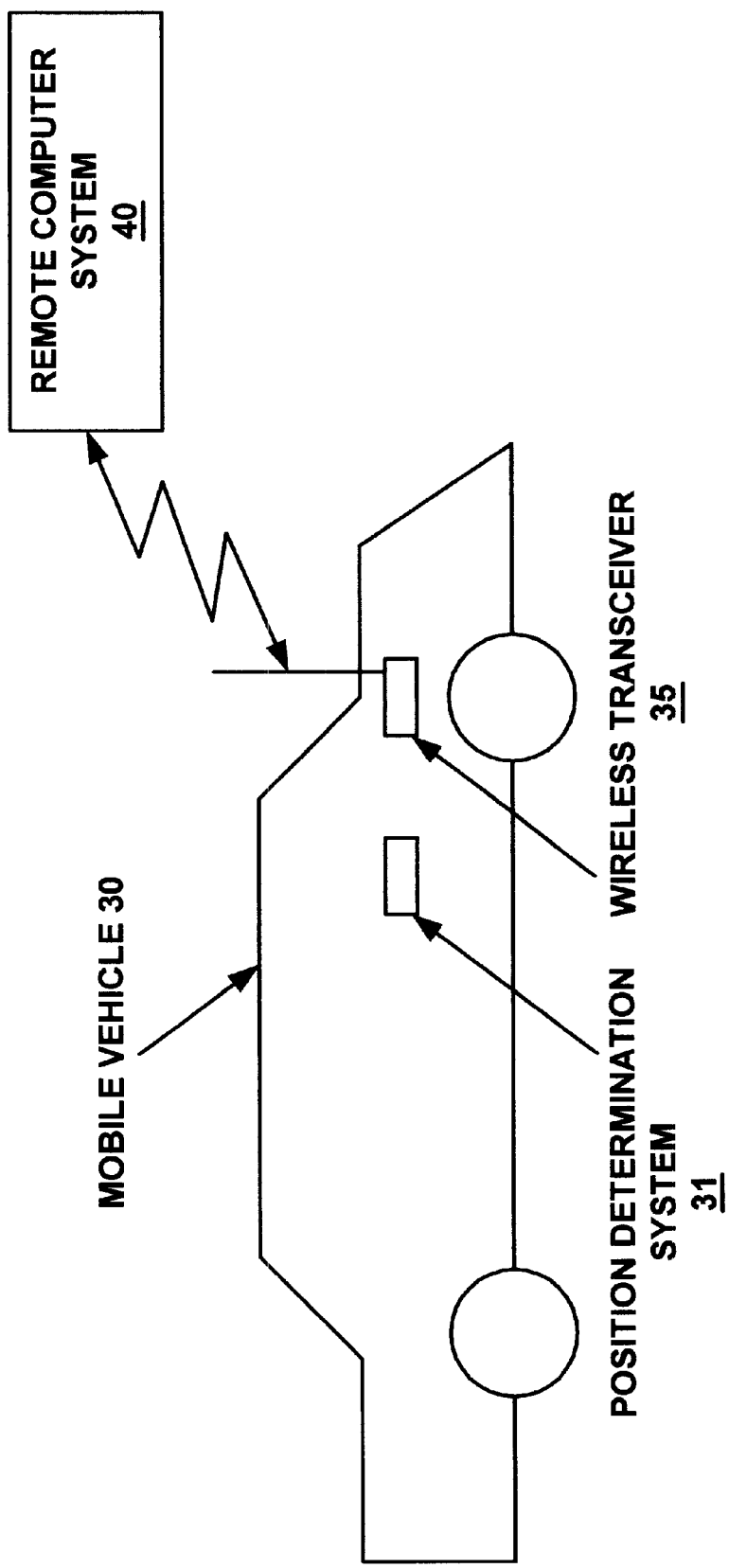
FIG. 1A is a side-perspective view illustrating an exemplary mobile vehicle with a position determination system in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as to not unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "selecting" or "displaying" or "determining" or "correlating" or "using" or "transmitting" or "receiving" or "communicating" or "providing" or the like, refer to actions and processes of a computer system (e.g., processes 600 and 700 of FIGS. 6 and 7, respectively), or similar electronic computing device, that manipulates and transforms data represented as physical (electronic) quantities within the computer system's registers and memories into other data similarly represented as physical quantities within the computer system memories or registers or other such information storage, transmission or display devices.

In the present embodiment, reference to a satellite position determination system, or "SATPOS" herein, refers to a Global Positioning System (GPS), to a Global Orbiting Satellite System (GLONASS), and to any other positioning system, including pseudolites, that provide signals that can be used to determine position. The terms "satellite position determination system" and "SATPOS," as used herein, are intended to include position determination using pseudolites or equivalents of pseudolites, and the terms "satellite position determination system signals" and "SATPOS signals," as used herein, are intended to include position determination system-like signals and data from pseudolites or equivalents of pseudolites. Also, signals from other sources such as LORAN, Wide Area Augmentation System (WAAS) satellites, etc., may be used to determine position.

FIG. 1A is a side-perspective view illustrating one embodiment of a mobile vehicle 30 in accordance with the present invention. Although FIG. 1A depicts a particular type of mobile vehicle 30, it is appreciated that mobile vehicle 30 can be any mobile platform capable of transporting one or more occupants. Accordingly, mobile vehicle 30 may be a land vehicle such as an automobile or motorcycle, a marine vessel, or an airborne craft. In general, mobile vehicle 30 has the ability to determine the vehicle's position (e.g., latitude, longitude, and direction of travel) as well as its speed and the time of day. Mobile vehicle 30 also has the ability to display textual or graphical content to an occupant of the vehicle, and the ability to change the display from one item of content to another en route.

With reference still to FIG. 1A, in the present embodiment, mobile vehicle 30 includes a position determination system 31. In one embodiment, position determination system 31 is used to determine the location of mobile vehicle 30. In another embodiment, position determination system 31 is also used to determine the direction of travel of mobile vehicle 30. Position determination system 31 can also be used to determine the time of day, although it is appreciated that other mechanisms may be used instead. The speed of mobile vehicle 30 can be either determined using conventional means (e.g., a speedometer) or derived using position determination system 31.

In one embodiment, mobile vehicle 30 includes a wireless transceiver 35 enabling two-way (e.g., radio) communication with remote computer system 40. Remote computer system 40 functions as a central source to provide content 32 and content-related information to mobile vehicle 30. Remote computer system 40 can also perform other functions and services pertaining to the dynamic targeting of content, and it can serve as an intermediary between mobile vehicle 30 and other devices and clients. Additional information is provided in conjunction with FIGS. 5, 6 and 7, below.

Figure 1B:
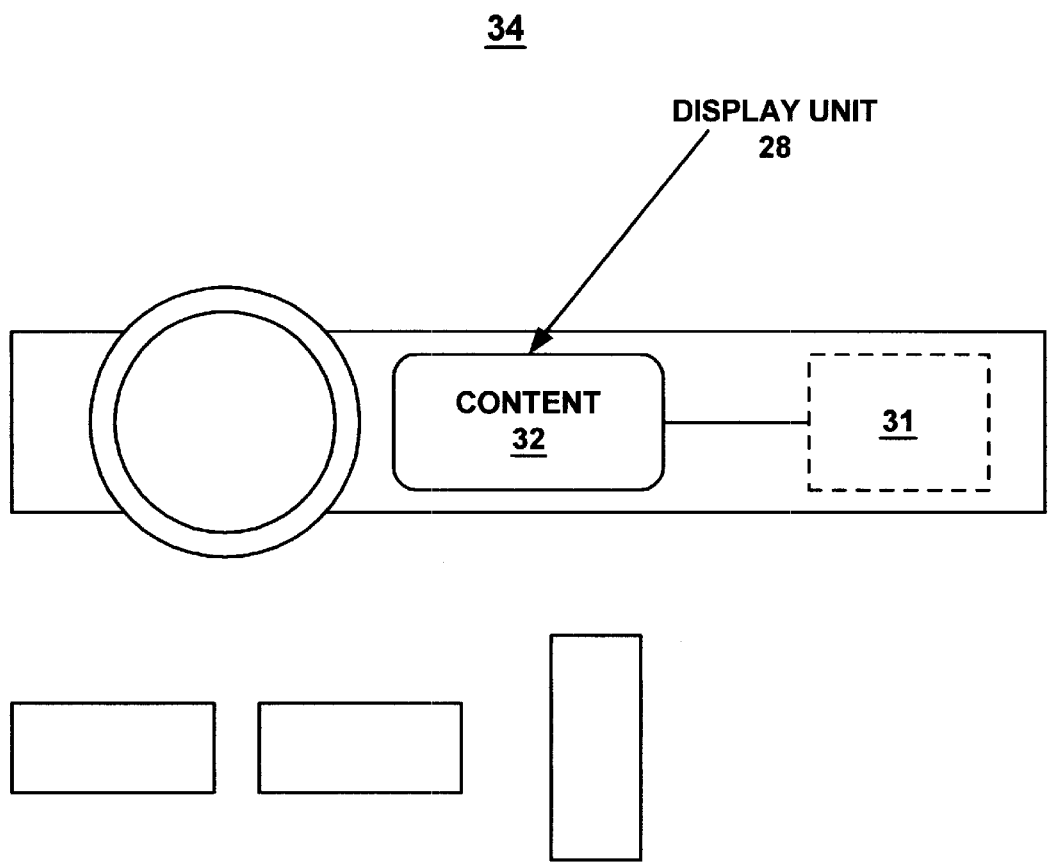
FIG. 1B is a representation of an exemplary vehicle interior showing a display unit in accordance with one embodiment of the present invention.

FIG. 1B is a representation of an exemplary vehicle interior 34 showing a display unit 28 in accordance with one embodiment of the present invention. Specifically, FIG. 1B shows a display unit 28 mounted in the dashboard of a mobile vehicle 30 (FIG. 1A). Display unit 28 is coupled to position determination system 31 and displays content 32 to the occupants of mobile vehicle 30. Display unit 28 can display content 32 which is changed as a function of spatial parameters (e.g., position and/or direction of travel of mobile vehicle 30) and/or temporal parameters. That is, the content 32 can be changed from one message to another while mobile vehicle 30 is en route, based on the vehicle's position and/or direction of travel, the time of day, and/or other factors.

In various embodiments, the display unit 28 may be a liquid crystal display device, a cathode ray tube (CRT), a field emission display device (also called a flat panel CRT), a thin film transistor (TFT) display device, an electroluminescent display device, a plasma display device, or another type of display device, electronic and otherwise, suitable for generating graphic images and alphanumeric characters for displaying messages. Display unit 28 may form part of a "heads-up" display (a display wherein a semi-transparent image is generated in, for example, the driver's line of sight).

It will be apparent to one of ordinary skill in the art that, in one embodiment, a audio unit capable of broadcasting an audible message can be used in combination with or instead of the display unit 28. The content 32 may thus also include a pre-recorded audible message, or the audible message may be generated using any of the various techniques and software programs available for converting text to voice.

Vehicle Position Determination System

Figure 2:
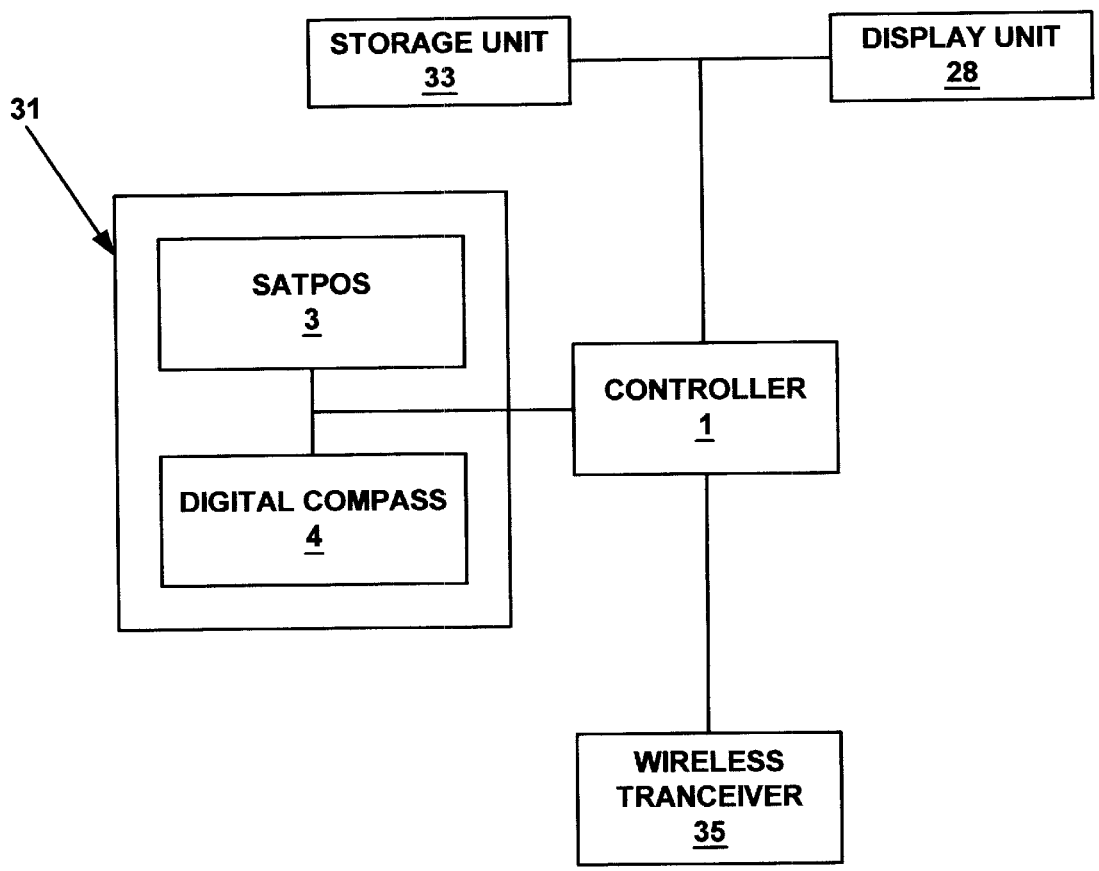
FIG. 2 is a block diagram of one embodiment of a position determination system for dynamic advertising in accordance with the present invention.

FIG. 2 is a block diagram of one embodiment of dynamic advertising system including a position determination system 31 in accordance with the present invention. In the present embodiment, position determination system 31 includes Satellite Positioning System (SATPOS) 3 that is operable for determining position. In one embodiment, SATPOS 3 is adapted to determine position using a Satellite Positioning System such as the US Global Positioning System (GPS).

In the GPS embodiment, SATPOS 3 determines its location by analysis of satellite position determining signals such as signals from satellites of the US GPS. In one embodiment, position signal processing circuitry in SATPOS 3 also determines the direction of movement of SATPOS 3, also referred to as the heading, and couples the determined heading to controller 1. In this embodiment, direction of movement is determined by comparing satellite position determining signals received as the position determination system 31 moves.

In another embodiment, position determination system 31 also includes digital compass 4. Digital compass 4 is operable to determine direction and couple direction to controller 1. More particularly, in the present embodiment, digital compass 4 determines the compass direction that corresponds to the orientation of position determination system 31.

Continuing with FIG. 2, controller 1 controls the operation of position determination system 31. In one embodiment, controller 1 is a general-purpose computer (such as that illustrated by FIG. 4, below). Alternatively, controller 1 can be an integrated circuit device such as a processor, microcontroller, Application Specific Integrated Circuit (ASIC) device, or Field Programmable Gate Array (FPGA) device operable to execute instructions contained in one or more software program(s). Controller 1 can be integrated with position determination system 31 as a single unit, or controller 1 and position determination system 31 may be coupled as separate units.

In the present embodiment, controller 1 is coupled to a storage unit 33 and to display unit 28. Storage unit 33 is for storing multiple items of the content 32 (FIG. 1B) that are to be displayed on display unit 28. Accordingly, in one embodiment, controller 1 can select from storage unit 33 the appropriate item of content 32, depending on the position and/or direction of travel of mobile vehicle 30 (FIG. 1A), as well as other information as described in conjunction with FIG. 4, below. In another embodiment, controller 1 can also select the appropriate item of content 32 from storage unit 33 depending on the time of day and/or the speed of mobile vehicle 30.

It is appreciated that, although the present invention is described for a visual display, the content 32 can also be audibly broadcast in combination with or instead of the display, using either pre-recorded audible messages or any of the various techniques and software programs available for converting text to voice.

With reference still to FIG. 2, content 32 can be provided by computer system 40 (FIG. 1A) for immediate display or broadcast. Alternatively, content 32 can be selected for display or broadcast from storage unit 33. Content 32 can be embodied in storage unit 33 as, for example, magnetic, optical, or electronic data that are converted into a visible display or audible message. Storage unit 33 can be a Random Access Memory (RAM) device such as, for example, a Static Random Access Memory (SRAM) device or a Dynamic Random Access Memory (DRAM) device. Alternatively, other types of memory storage devices such as flash memory, Read Only Memory (ROM), tape, CD ROM, or DVD may be used.

In the present embodiment, controller 1 of FIG. 2 is coupled to storage unit 33 and to display unit 28. Accordingly, controller 1 can select from storage unit 33 the appropriate item of content 32, depending on the position and/or direction of travel of mobile vehicle 30 (FIG. 1A), and according to instructions received from remote computer system 40 (FIG. 1A) via wireless transceiver 35. Controller 1 can also select the appropriate item of content 32 from storage unit 33 depending on other factors such as the time of day and the speed of mobile vehicle 30, according to instructions received from computer system 40 via wireless transceiver 35.

Figure 3:
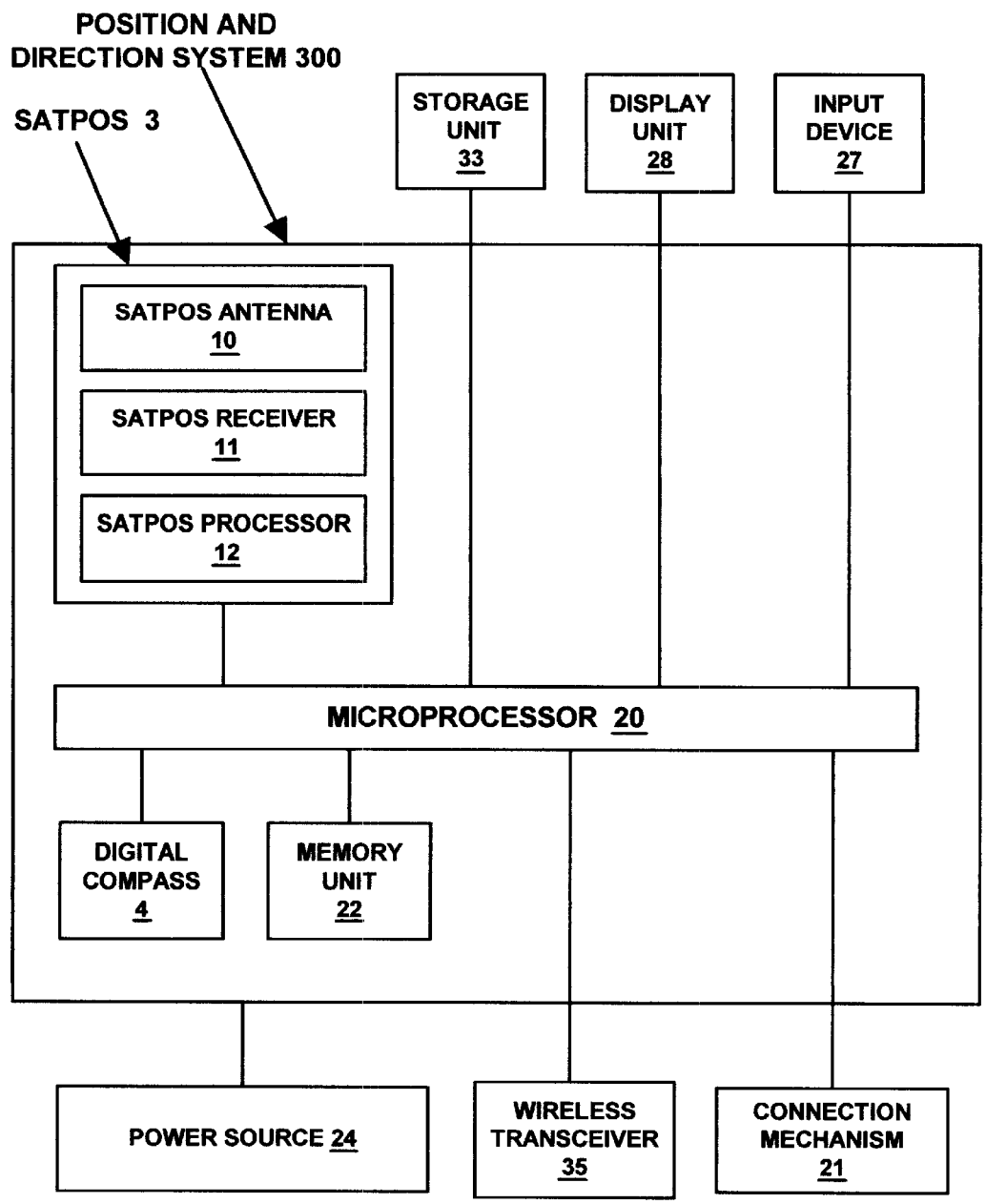
FIG. 3 is a block diagram of one embodiment of an integrated position and direction system for dynamic advertising in accordance with the present invention.

FIG. 3 is a block diagram of one embodiment of an integrated position and direction system 300 for dynamic advertising in accordance with the present invention. Integrated position and direction system 300 is shown to include SATPOS 3 that is operable for determining position. In the present embodiment, SATPOS 3 includes SATPOS antenna 10, SATPOS receiver 11, and SATPOS processor 12.

In one embodiment, SATPOS processor 12 is a GPS processor made by Trimble Navigation, Ltd., of Sunnyvale, Calif. In this embodiment, SATPOS antenna 10 is an ACE II GPS™ antenna, manufactured by Trimble Navigation, Ltd. and SATPOS receiver 11 includes a SIERRA GPS™ chipset, manufactured by Trimble Navigation, Ltd. Although such a specific implementation is described, the present invention is also well suited to an embodiment having various other components and features.

In the present embodiment, microprocessor 20 performs the functions of controller 1 of FIG. 2. In the present embodiment, microprocessor 20 is a general-purpose microprocessor that has low power consumption such as, for example, a Motorola RISC (reduced instruction set computer) microprocessor made by Motorola Inc. of Austin, Tex. Alternatively, another type of processor, an ASIC device or a FPGA device can be used. In another embodiment, SATPOS processor 12 is used for controlling the operations of integrated position and direction system 300 instead of microprocessor 20; accordingly, there may be no need for a second processor such as microprocessor 20.

Referring still to FIG. 3, in one embodiment, wireless transceiver 35 is coupled to microprocessor 20 and is adapted to provide wireless two-way communication with external devices such as, for example, remote computer system 40. Wireless transceiver 35 may be: cellular; a private radio in various bands such as a low-band pager operating at about 30 MHz; a data service device operating at about 216 MHz; a transceiver operating at other frequencies such as 450–470 MHz, 900 MHz, 2.4 GHz (e.g., IEEE 802.11 b); a part of a satellite-delivered link including those systems in which the transceiver is linked to a central dispatcher which in turn is linked to a satellite; or some other type of transceiver known in the art.

Thus, wireless transceiver 35 allows for downloading new programs and instructions for execution by microprocessor 20 and for updating of content 32. In another embodiment, connection mechanism 21 is also coupled to microprocessor 20 and is adapted to connect with remote computer system 40 for the downloading of content 32, instructions, and the like from remote computer system 40.

In one embodiment, input device 27 is coupled to microprocessor 20 and allows for coupling user input to microprocessor 20. In the present embodiment, input device 27 includes function keys and an alphanumeric keypad. Alternatively, input device 27 includes a trackball, mouse, touch pad, joystick. The present invention is also well suited to receiving user input by other means such as, for example, voice commands. Memory unit 22 comprises instructions that are operable on microprocessor 20 and that control the operations of integrated position and direction system 300.

Power source 24 provides power to the various components of integrated position and direction system 300. Power source 24 may be any suitable power source that is lightweight and compact such as, for example, built-in rechargeable batteries, size M batteries, or size AAA batteries. Alternatively, integrated position and direction system 300 can be powered by mobile vehicle 30 (FIG. 1A).

It is appreciated that, although integrated position and direction system 300 is described as performing functions pertaining to the dynamic targeting of content, these functions can instead be performed by a separate device on board mobile vehicle 30 that is coupled to integrated position and direction system 300.

Figure 4:
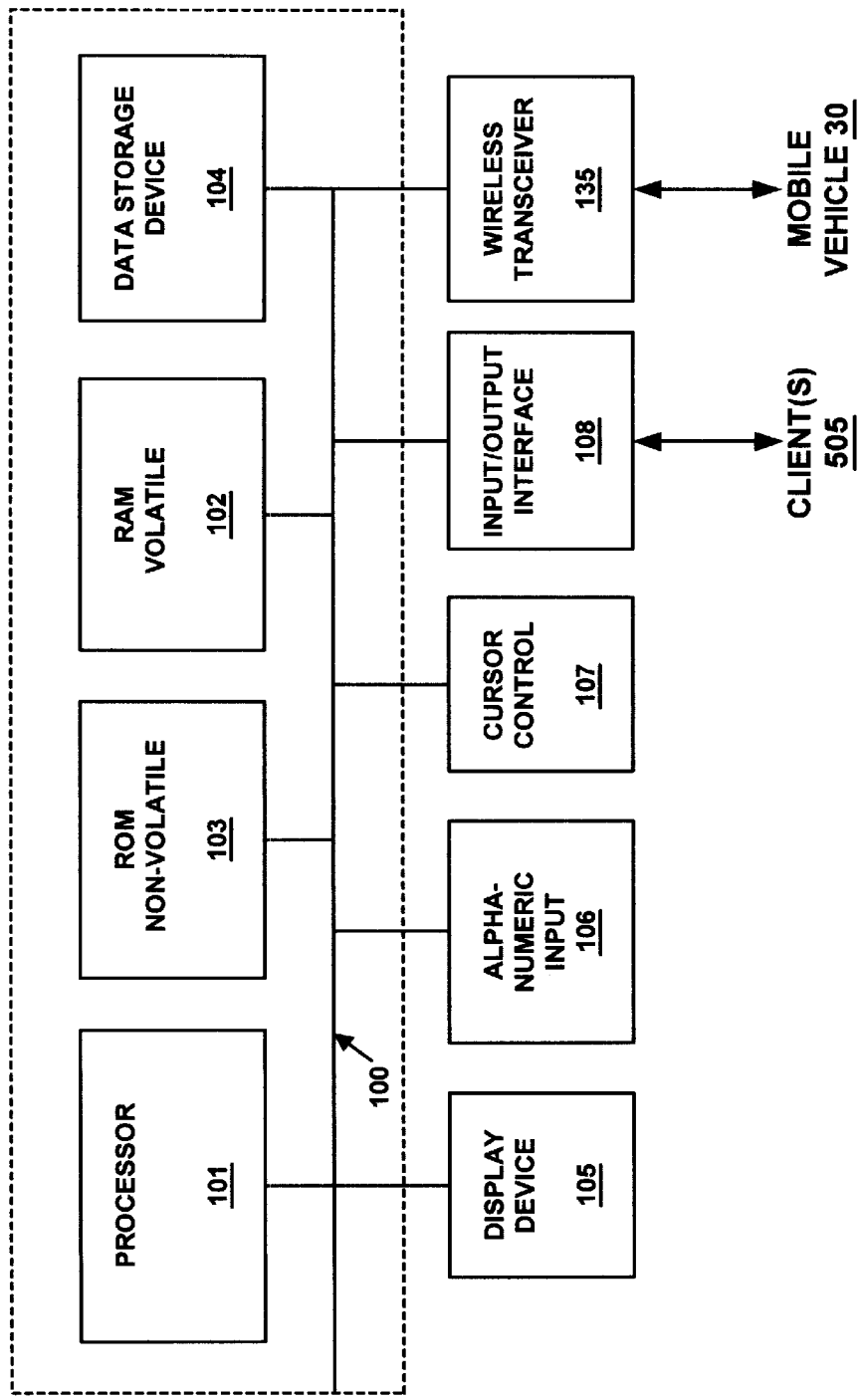
FIG. 4 is a block diagram of an exemplary computer system upon which embodiments of the present invention can be implemented.

Refer now to FIG. 4 which illustrates an exemplary computer system 40 upon which embodiments of the present invention may be practiced. In general, computer system 40 comprises bus 100 for communicating information, processor 101 coupled with bus 100 for processing information and instructions, random access (volatile) memory (RAM) 102 coupled with bus 100 for storing information and instructions for processor 101, read-only (non-volatile) memory (ROM) 103 coupled with bus 100 for storing static information and instructions for processor 101, data storage device 104 such as a magnetic or optical disk and disk drive coupled with bus 100 for storing information and instructions, an optional user output device such as display device 105 coupled to bus 100 for displaying information to the computer user, an optional user input device such as alphanumeric input device 106 including alphanumeric and function keys coupled to bus 100 for communicating information and command selections to processor 101, and an optional user input device such as cursor control device 107 coupled to bus 100 for communicating user input information and command selections to processor 101.

Display device 105 utilized with computer system 40 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

In the present embodiment, wireless transceiver 135 coupled to bus 100 allows computer system 40 to communicate wirelessly with mobile vehicle 30 (FIG. 1A). Furthermore, in one embodiment, an input/output (I/O) device 108 is used to couple computer system 40 onto, for example, a network of devices used by client(s) 505.

Figure 5:
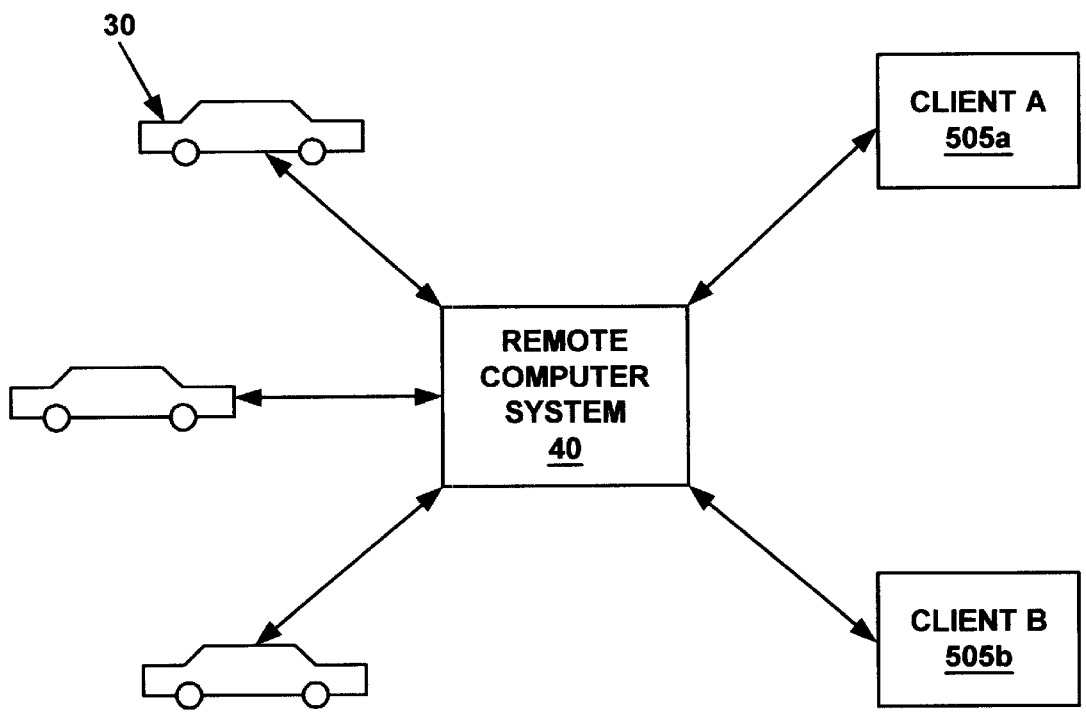
FIG. 5 is an illustration of a system linking mobile vehicles, a central source, and clients in accordance with one embodiment of the present invention.

FIG. 5 is an illustration of a system linking mobile vehicles 30, a central source (e.g., remote computer system 40), and clients 505a and 505b in accordance with one embodiment of the present invention. As described above, in the present embodiment, remote computer system 40 is communicatively linked to each of mobile vehicles 30 via a wireless (e.g., radio) connection.

In the present embodiment, clients 505a and 505b are devices enabling communication with remote computer system 40; that is, each of clients 505a and 505b may be a computer system, phone, two-way pager, palmtop or handheld computer device, or other data-capable or data-enabled device. Communication between clients 505a and 505b and computer system 40 can be accomplished over any network protocol that supports a network connection, such as Internet Protocol, TCP (Transmission Control Protocol), NetBIOS, IPX (Internet Packet Exchange), and LU6.2, and link layers protocols such as Ethernet, token ring, and ATM (Asynchronous Transfer Mode). Alternatively, computer system 40 and clients 505a and 505b can be coupled via their respective input/output ports (e.g., serial ports) or via wireless connections (e.g., according to IEEE 802.11b).

In accordance with the present embodiment of the present invention, remote computer system 40 can function as an advertising server located at, for example, an advertising agency, an application service provider, or commercial data center. As an advertising server, remote computer system 40 can perform the following functions: communicate new content 32 to mobile vehicle 30; communicate information and conditions pertinent to content 32 (e.g., when and where to display a specific item of content 32); receive requests from clients to display an advertisement (or message, alert, etc.), either immediately or in the future; orchestrate and arbitrate services to sell (auction) display time and space on a moment-by-moment basis; and bill clients based on the services rendered.

With regard to auction services, clients 505a and 505b can access remote computer system 40 to determine the locations of remote vehicles 30 and/or to determine if time and space are available for an advertisement or other such message. Each of clients 505a and 505b can enter a request (bid) to display content, perhaps at a specific time or location. A competitive bidding (auction) process, orchestrated by computer system 40, will unfold if clients are seeking the same time and display space. Clients 505a and 505b can directly input the content they want to have displayed, or they can retrieve content from a database of content that is stored on computer system 40. Clients 505a and 505b can also input conditions (e.g., when and where) for displaying their respective content.

Thus, in accordance with the present invention, clients 505a and 505b can directly provide input to each of mobile vehicles 30. Alternatively, the inputs from clients 505a and 505b are sorted by computer system 40 before distribution to remote vehicles 30. In summary, in accordance with the present invention, the various functions that are performed for dynamic advertising, from receiving input from a client to displaying content at a mobile vehicle, can be performed automatically by computer system 40.

Method for Updating User-based Dynamic Advertising

Figure 6:
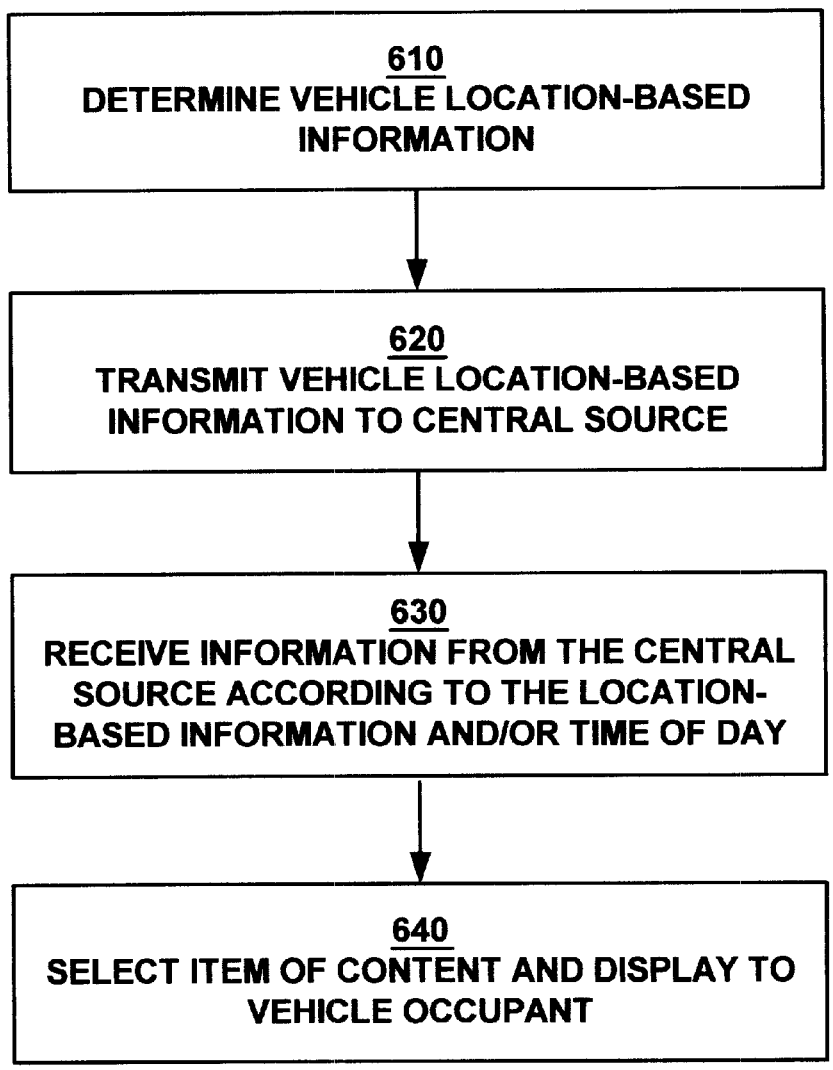
FIG. 6 is a flowchart of the steps in a process implemented at a mobile vehicle to dynamically target content in accordance with one embodiment of the present invention.

FIG. 6 is a flowchart of the steps in a process 600 implemented at a mobile vehicle 30 (FIG. 1A) to dynamically target content 32 (FIG. 1B) in accordance with one embodiment of the present invention. In the present embodiment, process 600 is implemented using elements of integrated position and direction system 300 (FIG. 3), as described below. However, it is appreciated that process 600 can also be implemented using a general purpose computer system (e.g., controller 1) in combination with a SATPOS 3 and/or a digital compass 4 (FIG. 2).

In step 610 of FIG. 6, in the present embodiment, the position of mobile vehicle 30 (FIG. 1A) is determined using SATPOS 3 (FIG. 2) or integrated position and direction system 300 (FIG. 3). In one embodiment, the direction of travel of mobile vehicle 30 is determined using digital compass 4 (FIG. 2) or integrated position and direction system 300. In another embodiment, the time of day is determined. Other information, such as the speed of mobile vehicle 30, can also be determined.

In step 620 of FIG. 6, the information determined in step 610 is provided to a central source (e.g., remote computer system 40 of FIG. 1A). In the present embodiment, the information is wirelessly transmitted from mobile vehicle 30 to remote computer system 40. In one embodiment, a user (e.g., an occupant of mobile vehicle 30) wirelessly transmits a request for a specific type of location-based content to remote computer system 40. For example, the occupant may make a request regarding a particular type of restaurant or service, or the request may be for a particular restaurant, etc., by name.

In step 630 of FIG. 6, the mobile vehicle 30 receives from computer system 40 information pertaining to the display of content 32 (FIG. 1B) as a function of the position of mobile vehicle 30, the direction of travel of mobile vehicle 30, the time of day, or some combination thereof. It is appreciated that other factors such as the speed of mobile vehicle 30 or the ambient conditions (e.g., weather, amount of traffic, etc.) can also be considered in the selection of the content 32 to be displayed. It is also appreciated that item(s) of content in response to a specific request (as in step 620) may be received.

In one embodiment, the information provided by computer system 40 contains content for immediate display. In another embodiment, the information provided by computer system 40 contains content for later display and instructions prescribing when and where the content is to be displayed. In yet another embodiment, the information provided by computer system 40 contains instructions prescribing when and where content previously provided to and stored by mobile vehicle 30 is to be displayed.

In step 640 of FIG. 6, the content 32 appropriate to the position, direction of travel, etc., of mobile vehicle 30 is displayed on display unit 28 (FIG. 1B). In the present embodiment, display unit 28 is viewable by an occupant of mobile vehicle 30. In accordance with the present invention, as spatial, temporal or other factors change, the content 32 displayed on display unit 28 is dynamically changed from one item to another. That is, for example, as mobile vehicle 30 moves or changes direction, the content 32 that is displayed is changed en route.

Figure 7:
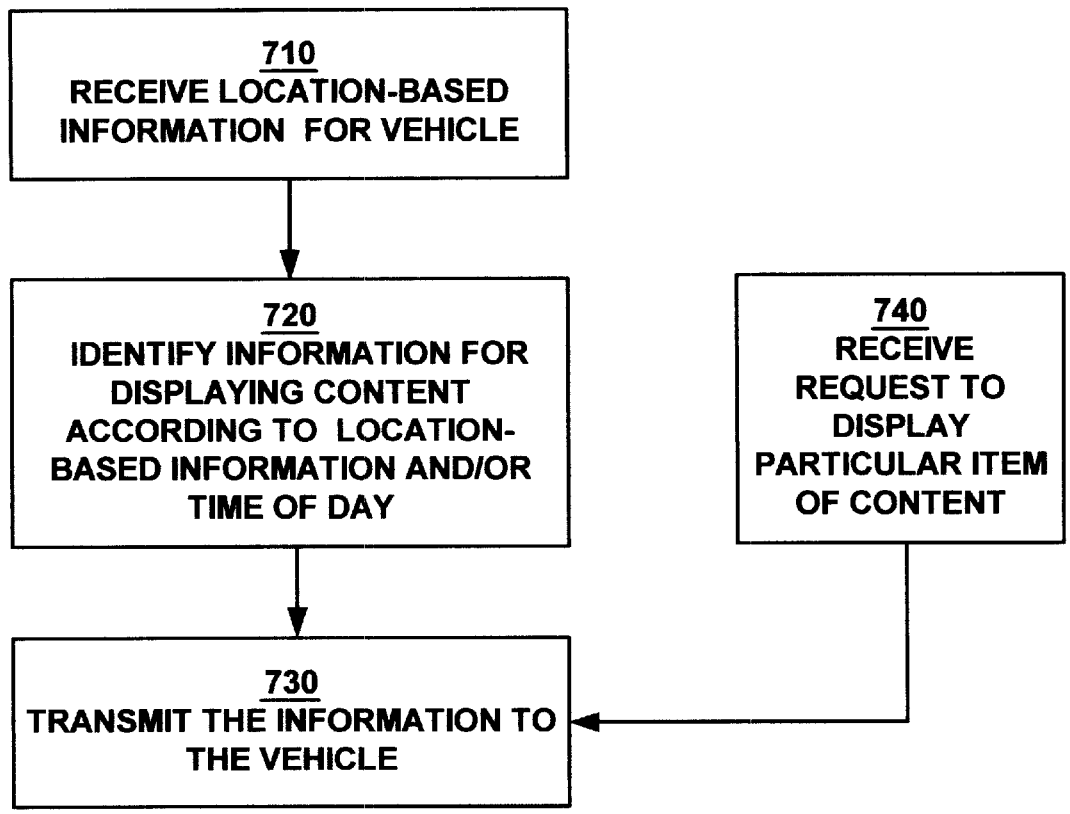
FIG. 7 is a flowchart of the steps in a process implemented at a central source to dynamically target content in accordance with one embodiment of the present invention.

FIG. 7 is a flowchart of the steps in a process 700 implemented at a central source (e.g., computer system 40 of FIGS. 1A and 5) to dynamically target content 32 (FIG. 1B) in accordance with one embodiment of the present invention. In this embodiment, process 700 is implemented by computer system 40 as computer-readable program instructions stored in a memory unit (e.g., ROM 103 of FIG. 4) and executed by a processor (e.g., processor 101 of FIG. 4).

In step 710 of FIG. 7, computer system 40 receives information from mobile vehicle 30 (FIGS. 1A and 5), indicating the position and direction of travel of the vehicle. As described above in conjunction with step 620 of FIG. 6, computer system 40 may also receive from mobile vehicle 30 a request for a particular type of information. In the present embodiment, the information is wirelessly transmitted from mobile vehicle 30 to computer system 40.

In step 720 of FIG. 7, computer system 40 identifies information to be transmitted to mobile vehicle 30 based on the information received in step 710.

In step 730, the information identified in step 720 is wirelessly transmitted to mobile vehicle 30. In one embodiment, the information provided by computer system 40 contains content for immediate display. In another embodiment, the information provided by computer system 40 contains content for later display and instructions prescribing when and where the content is to be displayed. In yet another embodiment, the information provided by computer system 40 contains instructions prescribing when and where content previously provided to and stored by mobile vehicle 30 is to be displayed.

In step 740 of FIG. 7, in one embodiment, computer system 40 executes services, including auction services, to sell space and time to service providers for displaying content, as described above in conjunction with FIG. 5. Computer system 40 can receive a request from a particular service provider to display at mobile vehicle 30 a particular item of content (e.g., an advertisement for the service provider). The service provider can also define the conditions under which the item of content is to be displayed at mobile vehicle 30; that is, the service provider can specify location-based information, the time of day, or other conditions for displaying the item of content. In turn, computer system 40 can determine which of mobile vehicles 30 (FIG. 5) should receive the item of content, for instant display or for display at a later time.

For example, a restaurant may elect to request that an advertisement be provided to all mobile vehicles 30 within a certain radius of the restaurant, or to all vehicles traveling in a direction approaching the restaurant, over a specified period of time. The advertisement may be transmitted to mobile vehicles 30 instantly, or at a later time or times, with instructions conditions for displaying the advertisement in a vehicle.

In summary, the present invention provides a method and system that can more effectively target advertisements and other content. In accordance with the present invention, content (advertisements, messages and the like) can be more precisely targeted by location, direction of travel and/or time of day, as well as other factors, making the content more relevant to the viewing audience and therefore more effective.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a mobile vehicle, an apparatus for dynamically communicating content according to location-based information, said apparatus comprising:
   a position determination system adapted to determine a position of said vehicle and a direction of travel of said vehicle;
   a wireless transceiver coupled to said position determination system; and
   a user interface coupled to said wireless transceiver, said user interface adapted to communicate content to an occupant of said vehicle;
   wherein said wireless transceiver transmits said position and said direction of travel of said vehicle to a central source and receives information transmitted from said central source, said information for selecting an item of content as a function of vehicle position and direction of travel; and
   wherein said item of content is communicated to said occupant using said user interface.

2. The apparatus of claim 1 comprising:
   a receiver coupled to said position determination system and adapted to receive transmitted position information used by said position determination system to determine said position and said direction of travel.

3. The apparatus of claim 2 wherein said position information is Global Positioning System (GPS) information.

4. The apparatus of claim 3 wherein said position determination system comprises:
   a digital compass adapted to determine said direction of travel using said GPS information; and
   a satellite positioning system adapted to determine said position using said GPS information.

5. The apparatus of claim 1 wherein said information from said central source is also for selecting said item of content as a function of time of day.

6. The apparatus of claim 1 wherein said position and direction of travel are correlated to geographical information in a database, wherein said information from said central source is also for selecting said item of content according to said geographical information.

7. The apparatus of claim 1 wherein said information from said central source comprises items of content for later display and instructions prescribing conditions for displaying said items of content, wherein said conditions comprise a vehicle position and direction of travel for displaying a respective item of content.

8. The apparatus of claim 1 wherein said information from said central source comprises instructions prescribing conditions for displaying items of content previously stored in a storage unit of said vehicle, wherein said conditions comprise a vehicle position and direction of travel for displaying a respective item of content.

9. The apparatus of claim 1 wherein said user interface comprises a display unit operable to visually communicate said item of content.

10. The vehicle of claim 1 wherein said user interface comprises an audio unit operable to audibly communicate said item of content.

11. In a mobile vehicle, a method of dynamically communicating content according to location-based information, said method comprising the steps of:

a) determining a position and a direction of travel of a mobile vehicle, said mobile vehicle having a user interface for communicating an item of content to an occupant of said mobile vehicle;
b) providing said position and said direction of travel to a central source;
c) receiving information from said central source, said information for selecting an item of content as a function of position and direction of travel of said mobile vehicle; and
d) communicating said item of content to said occupant using said user interface.

12. The method as recited in claim 11 wherein said step a) comprises the step of:
   receiving position information at said mobile vehicle, said position information for determining said position and said direction of travel of said mobile vehicle.

13. The method as recited in claim 12 wherein said position information is Global Positioning System (GPS) information.

14. The method as recited in claim 13 wherein said mobile vehicle comprises a position determination system comprising a digital compass adapted to determine said direction of travel using said GPS information and a satellite positioning system adapted to determine said position using said GPS information.

15. The method as recited in claim 11 wherein said information received in said step c) is also for selecting said item of content as a function of time of day.

16. The method as recited in claim 11 wherein said step b) further comprises the step of:
   correlating said position and said direction of travel to geographical information in a database, wherein said information received in said step c) is also for selecting said item of content as a function of said geographical information.

17. The method as recited in claim 11 wherein said information from said central source comprises items of content for later display and instructions prescribing conditions for displaying said items of content, wherein said conditions comprise a vehicle position and direction of travel for displaying a respective item of content.

18. The method as recited in claim 11 wherein said information from said central source comprises instructions prescribing conditions for displaying items of content previously stored in a storage unit of said vehicle, wherein said conditions comprise a vehicle position and direction of travel for displaying a respective item of content.

19. The method as recited in claim 11 wherein said step c) comprises the step of:
   communicating said item of content visually using a display unit.

20. The method as recited in claim 11 wherein said step c) comprises the step of:
   communicating said item of content audibly using an audio unit.

21. A method of dynamically communicating content according to location-based information, said method comprising the steps of:
   a) receiving information indicating a position and direction of travel of a mobile vehicle; and
   b) transmitting information to said mobile vehicle, said information for selecting an item of content as a function of position and direction of travel of said mobile vehicle, wherein said item of content is communicated to an occupant of said mobile vehicle using a user interface.

22. The method as recited in claim 21 wherein said information transmitted in said step b) comprises items of content for immediate display according to said position and direction of travel of said vehicle.

23. The method as recited in claim 21 wherein said information transmitted in said step b) comprises items of content for later display and instructions prescribing conditions for displaying said items of content, wherein said conditions comprise a vehicle position and direction of travel for displaying a respective item of content.

24. The method as recited in claim 21 wherein said information transmitted in said step b) comprises instructions prescribing conditions for displaying items of content previously stored in a storage unit of said mobile vehicle, wherein said conditions comprise a vehicle position and direction of travel for displaying a respective item of content.

25. The method as recited in claim 21 wherein said information transmitted in said step b) is also for displaying said item of content as a function of time of day.

26. The method as recited in claim 21 comprising the steps of:

receiving a request to display a particular item of content; and transmitting said particular item of content to said vehicle.

* * * * *